(No Model.)

W. S. HOW.
DENTAL TOOL.

No. 550,508. Patented Nov. 26, 1895.

WITNESSES:
Harry B. Barber
Edw. F. Simpson, Jr.

INVENTOR:
W. S. How,
J. S. Peyton,
By Atty

United States Patent Office.

WOODBURY STORER HOW, OF PHILADELPHIA, PENNSYLVANIA, ASSIGNOR TO THE S. S. WHITE DENTAL MANUFACTURING COMPANY, OF SAME PLACE.

DENTAL TOOL.

SPECIFICATION forming part of Letters Patent No. 550,508, dated November 26, 1895.

Application filed September 27, 1895. Serial No. 563,823. (No model.)

*To all whom it may concern:*

Be it known that I, WOODBURY STORER HOW, a citizen of the United States, residing at Philadelphia, in the county of Philadelphia and State of Pennsylvania, have invented certain new and useful Improvements in Dental Tools; and I do hereby declare the following to be a full, clear, and exact description of the invention, such as will enable others skilled in the art to which it appertains to make and use the same.

My invention relates to certain improvements, as hereinafter claimed, in handles or holders for dental tools of various kinds—such as pluggers, chisels, excavators, &c.; and my object is to provide such handles in simple and inexpensive way with lateral lugs or projections to prevent their rolling upon the trays, tables, &c., where they may be placed after or preparatory to use by dentists.

Figure 1:
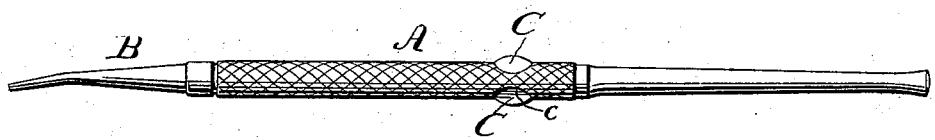
Figure 2:
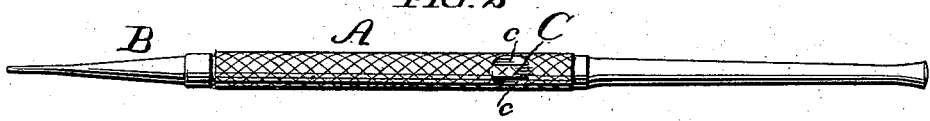
Figure 3:
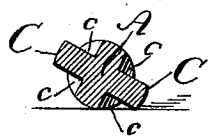
Figure 4:
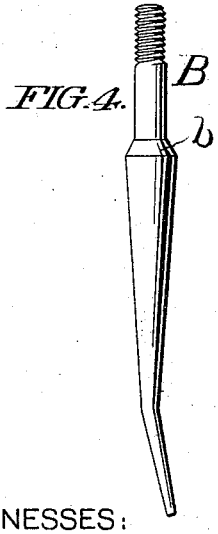
Figure 6:
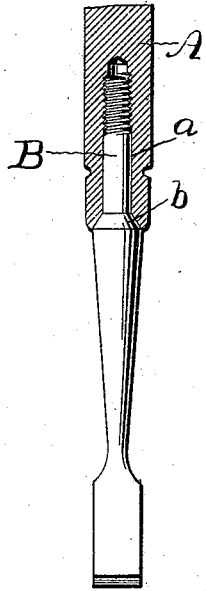
Figure 5:
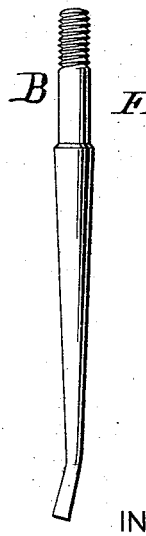

In the accompanying drawings, Figure 1 is a longitudinal view of the handle with a plugging-point attached; Fig. 2, a similar view at a right angle with Fig. 1. Fig. 3 is a view, on a larger scale, showing a transverse section of the handle through the projections formed therewith. Figs. 4 and 5 are enlarged views, respectively, showing a plugging-point and an excavating-point separate from their handles; and Fig. 6 shows a chisel-point attached to its handle, a portion of which is shown in section.

The tool holder or handle A of suitable metal is shown as provided with the screw-threaded and cone-ended socket $a$ to receive the threaded shank B of a suitable dental-tool point—such as that of a plugger, chisel, excavator, or equivalent implement—interchangeable therewith. The tapered or conical shoulder $b$ of the tool-shank is wedged or tightly drawn into the cone end of the handle-socket, so as to be securely held in place for use, as will readily be understood.

To prevent the rolling of the handles upon the surfaces of dentists' tool-trays, tables, &c., where they may be laid, the handles have lugs or projections C formed integral with them. These lugs project laterally to or at an angle with the handles. As shown in Figs. 1, 2, and 3, the handle is provided with two lugs or slight projections C, formed by pinching the metal with a suitable implement, the material displaced at the recess $c$ constituting the lugs. One such lug only may be provided, or more than two formed, as deemed desirable.

It will be seen that by my invention the handles may economically and expeditiously be formed with integral projections, which effectually prevent their displacement by rolling upon the surface, where they may be placed convenient to reach, while neither disfiguring nor marring the handles or interfering in any way with the use of the tools attached thereto.

Obviously the tool-handle may be integral with its operative point and the integral lug be located at the handle end or at any point on the handle or tool-shank without departing from the spirit of my invention.

I claim as my invention—

The dental tool handle having the side lug (or lugs) to prevent rolling, formed integral with it by laterally projecting material thereof, substantially as set forth.

In testimony whereof I affix my signature in presence of two witnesses.

WOODBURY STORER HOW.

Witnesses:
EDW. F. SIMPSON, Jr.,
R. DALE SPARHAWK.